US012330273B2

(12) United States Patent
Honda et al.

(10) Patent No.: US 12,330,273 B2
(45) Date of Patent: Jun. 17, 2025

(54) IMPACT ROTARY TOOL

(71) Applicant: Panasonic Intellectual Property Management Co., Ltd., Osaka (JP)

(72) Inventors: Akiko Honda, Osaka (JP); Masaya Sato, Mie (JP); Takahiro Ueda, Okayama (JP); Kimitaka Ozawa, Osaka (JP); Takashi Kusagawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/324,762

(22) Filed: May 26, 2023

(65) Prior Publication Data

US 2023/0398664 A1 Dec. 14, 2023

(30) Foreign Application Priority Data

Jun. 8, 2022 (JP) ................................ 2022-093317

(51) Int. Cl.
*B25B 21/02* (2006.01)

(52) U.S. Cl.
CPC .................................... *B25B 21/02* (2013.01)

(58) Field of Classification Search
CPC ....... B25B 21/02; B25B 21/026; B25B 21/00; B25B 23/1475; B25B 19/00; B25F 5/006; B25D 17/06; B25D 2217/0015; B25D 17/24; B25D 11/068
USPC ........................................................ 173/93.5
See application file for complete search history.

(56) References Cited

U.S. PATENT DOCUMENTS

| | | | | |
|---|---|---|---|---|
| 3,220,525 | A * | 11/1965 | Pauley ................ | B25B 23/1453 192/150 |
| 5,601,149 | A * | 2/1997 | Kawasaki ............ | B25B 21/026 173/93.5 |
| 7,416,031 | B2 | 8/2008 | Murakami et al. | |
| 8,651,198 | B2 | 2/2014 | Ito | |
| 10,974,372 | B2 * | 4/2021 | Tejima .................... | B25B 19/00 |

(Continued)

FOREIGN PATENT DOCUMENTS

| | | | |
|---|---|---|---|
| EP | 3067156 | A1 | 9/2016 |
| EP | 4134202 | A1 | 2/2023 |

(Continued)

OTHER PUBLICATIONS

Extended European Search Report dated Oct. 9, 2023 issued in the corresponding European Patent Application No. 23176061.2.

(Continued)

*Primary Examiner* — Dariush Seif
(74) *Attorney, Agent, or Firm* — Rimon P.C.

(57) ABSTRACT

An impact rotary tool includes a hammer, an anvil, an output shaft, a housing, a bearing (first bearing), and a buffer member. The buffer member includes an elastic member. The anvil has a first facing region. The output shaft has a second facing region. The buffer member is interposed between the anvil and the output shaft. The buffer member regulates a gap distance between the second facing region and the first facing region such that when a maximum load is transmitted from the hammer to the elastic member, the second facing region faces the first facing region with a gap left between the second facing region and the first facing region in a thrusting direction.

6 Claims, 10 Drawing Sheets

(56) References Cited

U.S. PATENT DOCUMENTS

| | | | | |
|---|---|---|---|---|
| 11,865,689 | B2 * | 1/2024 | Kusagawa | B25B 21/026 |
| 11,980,948 | B2 * | 5/2024 | Tamura | B23Q 3/12 |
| 2002/0134172 | A1 * | 9/2002 | Yamada | B25B 23/1405 73/862.21 |
| 2005/0045354 | A1 * | 3/2005 | Arimura | B25B 23/14 173/219 |
| 2006/0254786 | A1 | 11/2006 | Murakami et al. | |
| 2007/0179328 | A1 * | 8/2007 | Murakami | B25B 21/02 585/448 |
| 2007/0267207 | A1 * | 11/2007 | Ito | B25B 21/02 173/217 |
| 2007/0289760 | A1 * | 12/2007 | Sterling | B25B 21/02 173/104 |
| 2014/0182869 | A1 * | 7/2014 | Kumagai | B25F 5/008 173/93 |
| 2016/0075004 | A1 * | 3/2016 | Tsubakimoto | B25B 21/026 173/93 |
| 2016/0263731 | A1 * | 9/2016 | Matsumoto | B25B 21/02 |
| 2017/0165817 | A1 * | 6/2017 | Vogt | B25B 21/02 |
| 2017/0259411 | A1 * | 9/2017 | Ishibashi | B25B 21/02 |
| 2018/0222022 | A1 * | 8/2018 | Kumagai | B25D 11/104 |
| 2019/0118363 | A1 * | 4/2019 | Fuenfer | B25D 17/06 |
| 2019/0262978 | A1 | 8/2019 | Tejima et al. | |
| 2020/0217412 | A1 * | 7/2020 | Nakashima | F16H 57/082 |
| 2021/0023629 | A1 * | 1/2021 | Kawai | B25D 16/00 |
| 2021/0053201 | A1 * | 2/2021 | Mandal | B25F 5/006 |
| 2023/0121902 | A1 * | 4/2023 | Nakashima | B25F 5/026 173/162.1 |

FOREIGN PATENT DOCUMENTS

| | | | |
|---|---|---|---|
| JP | H07-237152 | A | 9/1995 |
| JP | 2002-254335 | A | 9/2002 |
| JP | 2006-315093 | A | 11/2006 |
| JP | 2008-284660 | A | 11/2008 |
| JP | 2010-076022 | A | 4/2010 |
| JP | 2019-141984 | A | 8/2019 |
| JP | 2022-019061 | A | 1/2022 |

OTHER PUBLICATIONS

Extended European Search Report dated Nov. 16, 2023 issued in the corresponding European Patent Application No. 23176052.1.

Notice of Allowance dated Sep. 11, 2024 issued in the corresponding U.S. Appl. No. 18/324,769.

Notice of Reasons for Refusal dated Nov. 5, 2024 issued in the corresponding Japanese Patent Application No. 2022-093317, with English translation.

Notice of Reasons for Refusal dated Oct. 29, 2024 issued in the corresponding Japanese Patent Application No. 2022-093318, with English translation.

* cited by examiner

IMPACT ROTARY TOOL

CROSS-REFERENCE TO RELATED APPLICATIONS

The present application is based upon, and claims the benefit of priority to, Japanese Patent Application No. 2022-093317, filed on Jun. 8, 2022, the entire contents of which are hereby incorporated by reference.

TECHNICAL FIELD

The present disclosure generally relates to an impact rotary tool and more particularly relates to an impact rotary tool including a hammer and an anvil.

BACKGROUND ART

JP H07-237152 A discloses an impact rotary tool. In the impact rotary tool, a rotational impacting force generating mechanism is attached to a spindle, which is connected to a drive motor via a speed reducer, to apply rotational impacting force to one end of an anvil. The anvil includes a means to which a tip tool is coupled. The impact rotary tool is characterized by dividing the anvil into two parts, namely, a rotational impacting member and a tip tool chucking member (output shaft), a torque transmission portion is provided between the rotational impacting member and the tip tool chucking member, and either an elastic member or a buffer member is interposed in an axial gap between the rotational impacting member and the tip tool chucking member.

SUMMARY

The present disclosure provides an impact rotary tool with the ability to reduce the chances of generating a collision noise due to collision between the anvil and the output shaft.

An impact rotary tool according to an aspect of the present disclosure includes a hammer, an anvil, an output shaft, a housing, a bearing, and a buffer member. The hammer rotates upon receiving motive power from a motor. The anvil rotates upon receiving, from the hammer, impacting force in a rotational direction of the hammer. The output shaft is configured to hold a tip tool thereon and rotates along with the anvil upon receiving, from the anvil, force in a rotational direction of the anvil. The housing houses the hammer and the anvil. The bearing is held by the housing and supports the output shaft rotatably. The buffer member includes an elastic member to be elastically deformed in a thrusting direction aligned with a rotational axis of the output shaft. The anvil has a first facing region facing the output shaft in the thrusting direction. The output shaft has a second facing region facing the first facing region in the thrusting direction. The buffer member is interposed between the anvil and the output shaft. The elastic member is compressed in the thrusting direction under a load transmitted in the thrusting direction from the hammer. The buffer member regulates a gap distance between the second facing region and the first facing region such that when a maximum load is transmitted from the hammer to the elastic member, the second facing region faces the first facing region with a gap left between the second facing region and the first facing region in the thrusting direction.

BRIEF DESCRIPTION OF DRAWINGS

The figures depict one or more implementations in accordance with the present teaching, by way of example only, not by way of limitations. In the figures, like reference numerals refer to the same or similar elements.

DETAILED DESCRIPTION

Embodiment

An impact rotary tool 1 according to an exemplary embodiment will be described with reference to the accompanying drawings. Note that the embodiment to be described below is only an exemplary one of various embodiments of the present disclosure and should not be construed as limiting. Rather, the exemplary embodiment may be readily modified in various manners depending on a design choice or any other factor without departing from the scope of the present disclosure. The drawings to be referred to in the following description of embodiments are all schematic representations. Thus, the ratio of the dimensions (including thicknesses) of respective constituent elements illustrated on the drawings does not always reflect their actual dimensional ratio.

(Overview)

Figure 1:
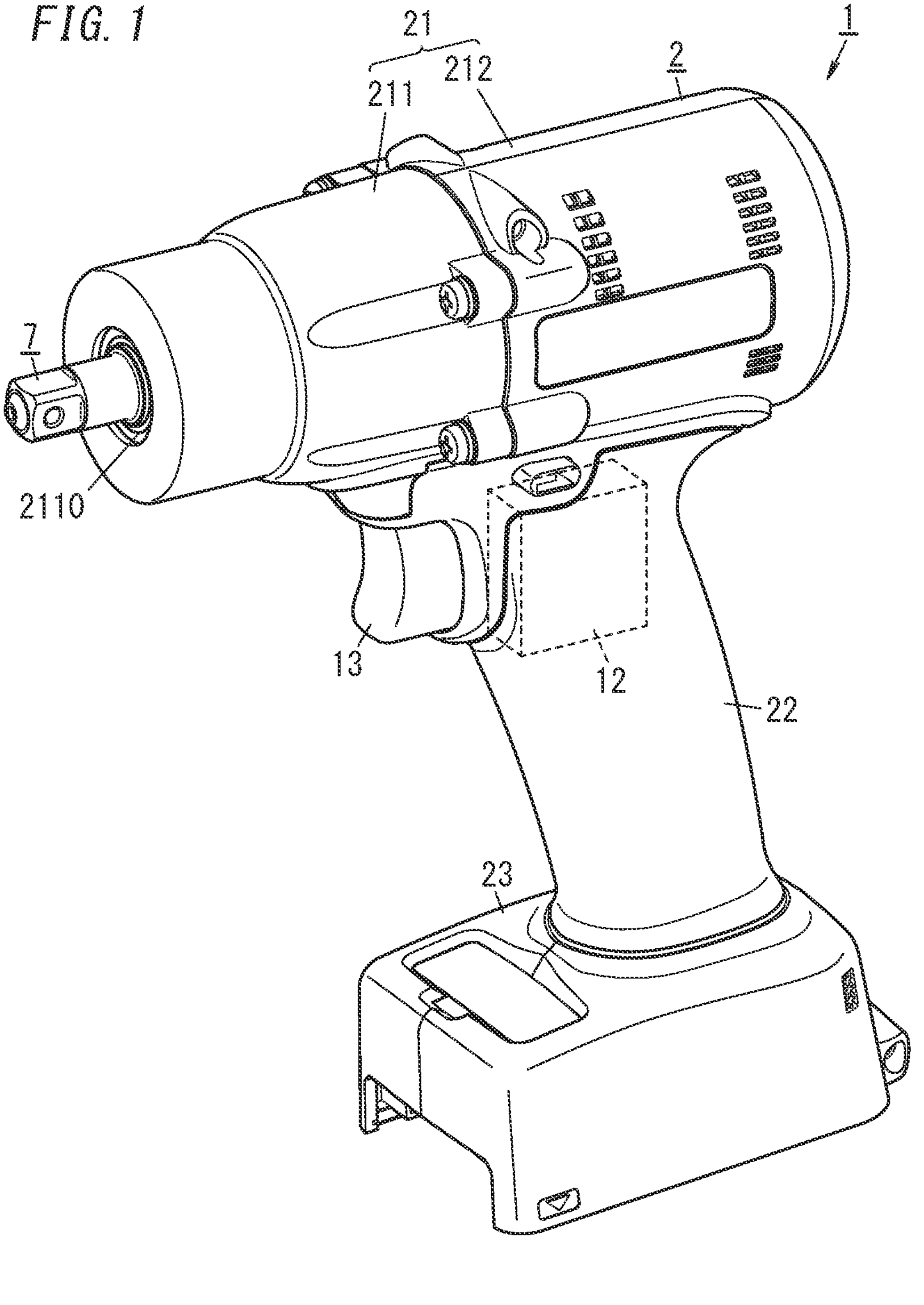
FIG. 1 is a perspective view of an impact rotary tool according to an exemplary embodiment.
Figure 2:
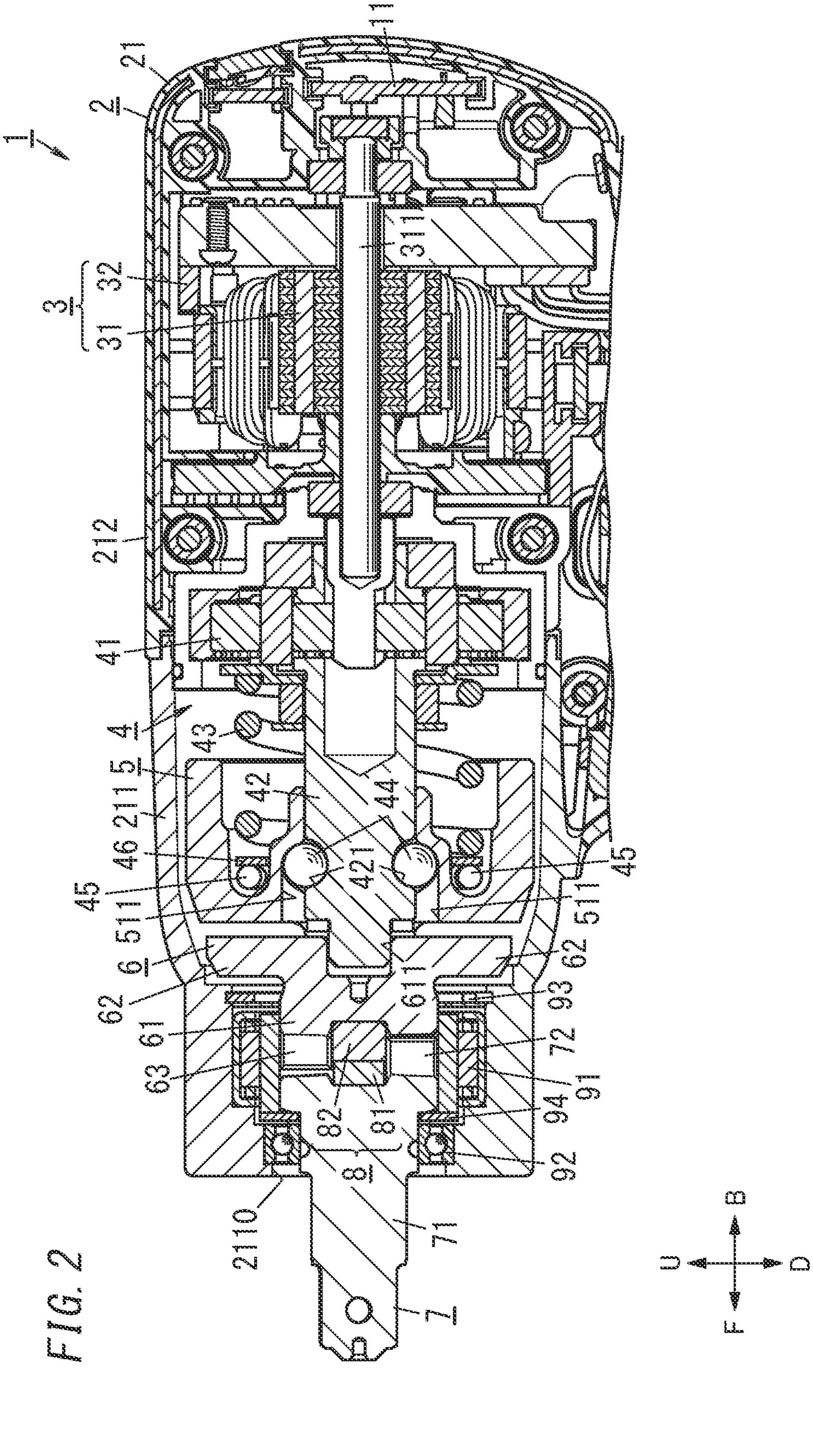
FIG. 2 is a cross-sectional view of the impact rotary tool.

As shown in FIGS. 1 and 2, an impact rotary tool 1 according to an exemplary embodiment includes a hammer 5, an anvil 6, an output shaft 7, a housing 2, a bearing (first bearing 91), and a buffer member 8. The hammer 5 rotates upon receiving motive power from a motor 3. The anvil 6 rotates upon receiving, from the hammer 5, impacting force in a rotational direction of the hammer 5. The output shaft 7 is configured to hold a tip tool thereon and rotates along with the anvil 6 upon receiving, from the anvil 6, force in a rotational direction of the anvil 6. The housing 2 houses the hammer 5 and the anvil 6. The bearing (first bearing 91) is held by the housing 2 and supports the output shaft 7 rotatably. The buffer member 8 includes an elastic member 81 to be elastically deformed in a thrusting direction aligned with a rotational axis of the output shaft 7. The anvil 6 has a first facing region F1 (refer to FIG. 7) facing the output shaft 7 in the thrusting direction. The output shaft 7 has a second facing region F2 (refer to FIG. 7) facing the first facing region F1 in the thrusting direction. The buffer member 8 is interposed between the anvil 6 and the output shaft 7. The elastic member 81 is compressed in the thrusting direction under a load transmitted in the thrusting direction from the hammer 5. The buffer member 8 regulates a gap distance between the second facing region F2 and the first facing region F1 such that when a maximum load is transmitted from the hammer 5 to the elastic member 81, the second facing region F2 faces the first facing region F1 with a gap left between the second facing region F2 and the first facing region F1 in the thrusting direction.

This configuration may reduce the chances of the anvil 6 colliding against the output shaft 7, thus reducing not only the chances of generating a collision noise but also the chances of vibrations caused by the collision being transmitted to the housing 2. It is not until the vibrations of the anvil 6 in the thrusting direction are reduced by the buffer member 8 that the vibrations are transmitted to the output shaft 7, thus enabling reducing the vibration of the output shaft 7.

Also, an impact rotary tool 1 according to another exemplary embodiment includes a hammer 5, an anvil 6, an output shaft 7, a housing 2, and a bearing (first bearing 91). The hammer 5 rotates upon receiving motive power from a motor 3. The anvil 6 rotates upon receiving, from the hammer 5, impacting force in a rotational direction of the hammer 5. The output shaft 7 is configured to hold a tip tool thereon and rotates along with the anvil 6 upon receiving, from the anvil 6, force in a rotational direction of the anvil 6. The housing 2 houses the hammer 5 and the anvil 6. The bearing (first bearing 91) is held by the housing 2. The anvil 6 includes a first contact portion 63. The first contact portion 63 contacts with the output shaft 7. The output shaft 7 includes a second contact portion 72. The second contact portion 72 contacts with the first contact portion 63. The second contact portion 72 receives, from the first contact portion 63, force that causes the output shaft 7 to rotate. The bearing (first bearing 91) is in contact with at least one of the first contact portion 63 or the second contact portion 72 and supports at least one of the output shaft 7 or the anvil 6 rotatably.

This configuration brings at least one of the first contact portion 63 or the second contact portion 72 into contact with the bearing (first bearing 91), thus enhancing the mechanical strength thereof. In particular, at least one of the first contact portion 63 or the second contact portion 72 has its mechanical strength enhanced against vibrations along the radius of the output shaft 7. This increases the durability of at least one of the anvil 6 or the output shaft 7.

(Details)

(1) Overall Configuration

Next, an impact rotary tool 1 according to this embodiment will be described in detail.

In the following description, a direction in which the anvil 6 and the output shaft 7 are arranged side by side will be hereinafter defined as a "forward/backward direction" with the output shaft 7 supposed to be located forward of the anvil 6 and with the anvil 6 supposed to be located backward of the output shaft 7. Also, in the following description, a direction in which a housing portion 21 and a grip 22 (to be described later) are arranged one on top of the other will be hereinafter defined as an "upward/downward direction" with the housing portion 21 supposed to be located upward of the grip 22 and with the grip 22 supposed to be located downward of the housing portion 21. Furthermore, the direction perpendicular to both the forward/backward direction and the upward/downward direction is defined to be a rightward/leftward direction. Nevertheless, these definitions should not be construed as limiting the directions in which the impact rotary tool 1 is supposed to be used. Note that the arrows indicating the forward/backward directions and the upward/downward directions are shown in FIG. 2 just for the sake of description and are insubstantial ones.

Also, the thrusting direction as used herein refers to a direction aligned with the rotational axis of the output shaft 7. The thrusting direction is aligned with the forward/backward directions.

The impact rotary tool 1 according to this embodiment is a portable electric tool. As shown in FIGS. 1 and 2, the impact rotary tool 1 may include, for example, the housing 2, the motor 3, a transmission mechanism 4, the hammer 5, the anvil 6, the output shaft 7, the buffer member 8, the first bearing 91, a second bearing 92, a first stopper 93, a second stopper 94, a driver circuit 11, a control circuit 12, and an operating member 13.

(2) Housing

The housing 2 houses, for example, the motor 3, the transmission mechanism 4, the hammer 5, the anvil 6, the buffer member 8, the first bearing 91, the second bearing 92, the first stopper 93, the second stopper 94, the driver circuit 11, and the control circuit 12. As shown in FIG. 1, the housing 2 includes the housing portion 21, the grip 22, and an attachment 23.

The housing portion 21 has the shape of a hollow cylinder. The housing portion 21 includes a first housing portion 211 and a second housing portion 212. The first housing portion 211 is provided forward of the second housing portion 212. The first housing portion 211 is coupled to the second housing portion 212. The first housing portion 211 houses at least the hammer 5 and the anvil 6. In the first housing portion 211, the first bearing 91 and the second bearing 92 are held. The first housing portion 211 has a through hole 2110 to pass the output shaft 7 therethrough.

The grip 22 protrudes from an outer peripheral surface of the housing portion 21 in one direction aligned with the radius of the housing portion 21. More specifically, the grip 22 protrudes from the second housing portion 212. The one direction is aligned with the upward/downward direction. The grip 22 is formed in the shape of a hollow cylinder, which is elongate in the one direction. The worker may perform the work of fastening a screw, for example, by gripping the grip 22. In addition, the operating member 13 for accepting the worker's operating command is also held in the grip 22.

The internal space of the grip 22 communicates with the internal space of the housing portion 21. The housing portion 21 is connected to one longitudinal end of the grip 22 and the attachment 23 is connected to the other longitudinal end of the grip 22.

A battery pack is attached removably to the attachment 23. The impact rotary tool 1 is powered by the battery pack. That is to say, the battery pack is a power supply that supplies a current for driving the motor 3. In this embodiment, the battery pack is not a constituent element of the impact rotary tool 1. However, this is only an example and should not be construed as limiting. Alternatively, the impact rotary tool 1 may include the battery pack as one of constituent elements thereof.

(3) Motor

As shown in FIG. 2, the motor 3 is housed in the housing portion 21 of the housing 2. The motor 3 may be, for example, a brushless motor. The motor 3 includes: a rotor 31 including a rotary shaft 311 and a permanent magnet; and a stator 32 including a coil. The rotor 31 rotates with respect to the stator 32 due to electromagnetic interactions between the permanent magnet and the coil.

The motor 3 may also be, for example, a servo motor. The torque and rotational velocity of the motor 3 vary under the control of the control circuit 12 (refer to FIG. 1). The control circuit 12 may be a servo driver. The control circuit 12 controls the operation of the motor 3 by feedback control to be performed to control the torque and rotational velocity of the motor 3 toward target values.

The worker operates the operating member 13. Specifically, the worker pulls the operating member 13. The control circuit 12 determines the target value of the rotational velocity of the motor 3 according to the manipulative variable of the operating member 13 (i.e., depending on how deep the operating member 13 has been pulled). The greater the manipulative variable is, the more significantly the control circuit 12 increases the target value of the rotational velocity of the motor 3.

The driver circuit 11 (refer to FIG. 2) includes a board and a plurality of electronic components mounted on the board. The plurality of electronic components includes a plurality of power elements that form an inverter circuit. Examples of the power elements include field effect transistors (FETs).

The control circuit 12 controls the motor 3 via the driver circuit 11. That is to say, the control circuit 12 controls the power supplied to the motor 3 via the plurality of power elements (i.e., the inverter circuit) by turning ON and OFF the plurality of power elements of the driver circuit 11.

(4) Transmission Mechanism

As shown in FIG. 2, the transmission mechanism 4 is housed in the housing portion 21 of the housing 2. The transmission mechanism 4 transmits the motive power of the motor 3 to the hammer 5, thus causing the hammer 5 to rotate.

The transmission mechanism 4 includes, for example, a planetary gear mechanism 41, a drive shaft 42, a return spring 43, two first spheres 44 (steel spheres), two second spheres 45 (steel spheres), and a ring 46.

The planetary gear mechanism 41 transforms the rotational velocity and torque of the rotary shaft 311 of the motor 3 into a predetermined rotational velocity and predetermined torque. The planetary gear mechanism 41 is a speed reducer. The torque of the rotary shaft 311 of the motor 3 is transmitted via the planetary gear mechanism 41 to the drive shaft 42. The torque of the drive shaft 42 is transmitted to the hammer 5, thus causing the hammer 5 to rotate.

The return spring 43 according to this embodiment is a conical coil spring. The return spring 43 applies forward thrusting force to the hammer 5. The ring 46 is interposed between the return spring 43 and the hammer 5. The two second spheres 45 are sandwiched between the ring 46 and the hammer 5. This allows the hammer 5 to rotate with respect to the return spring 43.

(5) Hammer, Anvil, and Output Shaft

The impact rotary tool 1 according to this embodiment is an electric impact screwdriver designed to fasten a screw while performing an impact operation. In the impact operation, impacting force is applied from the hammer 5 to the anvil 6 and then transmitted to the tip tool via the output shaft 7.

Figure 3:
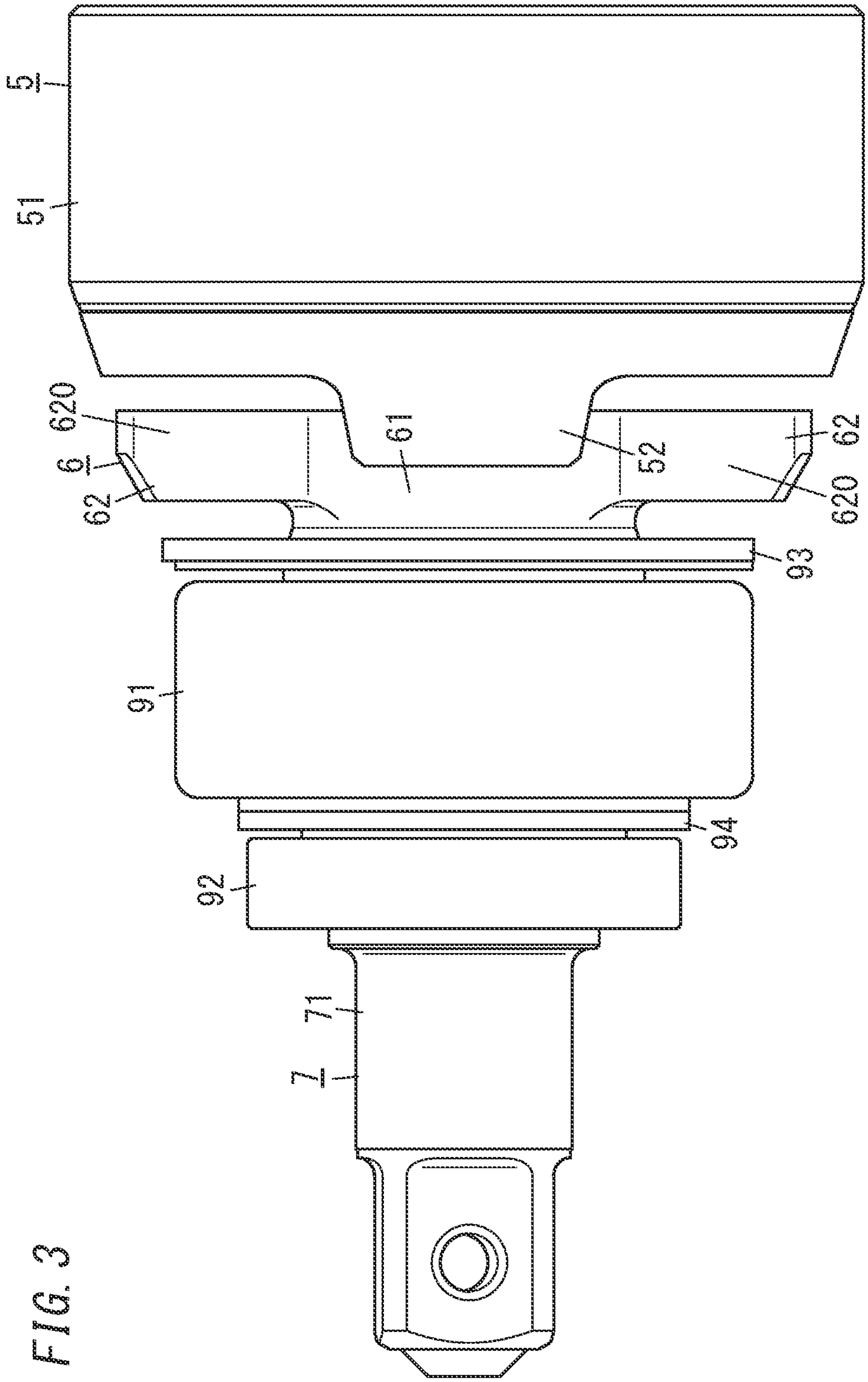
FIG. 3 is a front view of a main part of the impact rotary tool.
Figure 4:
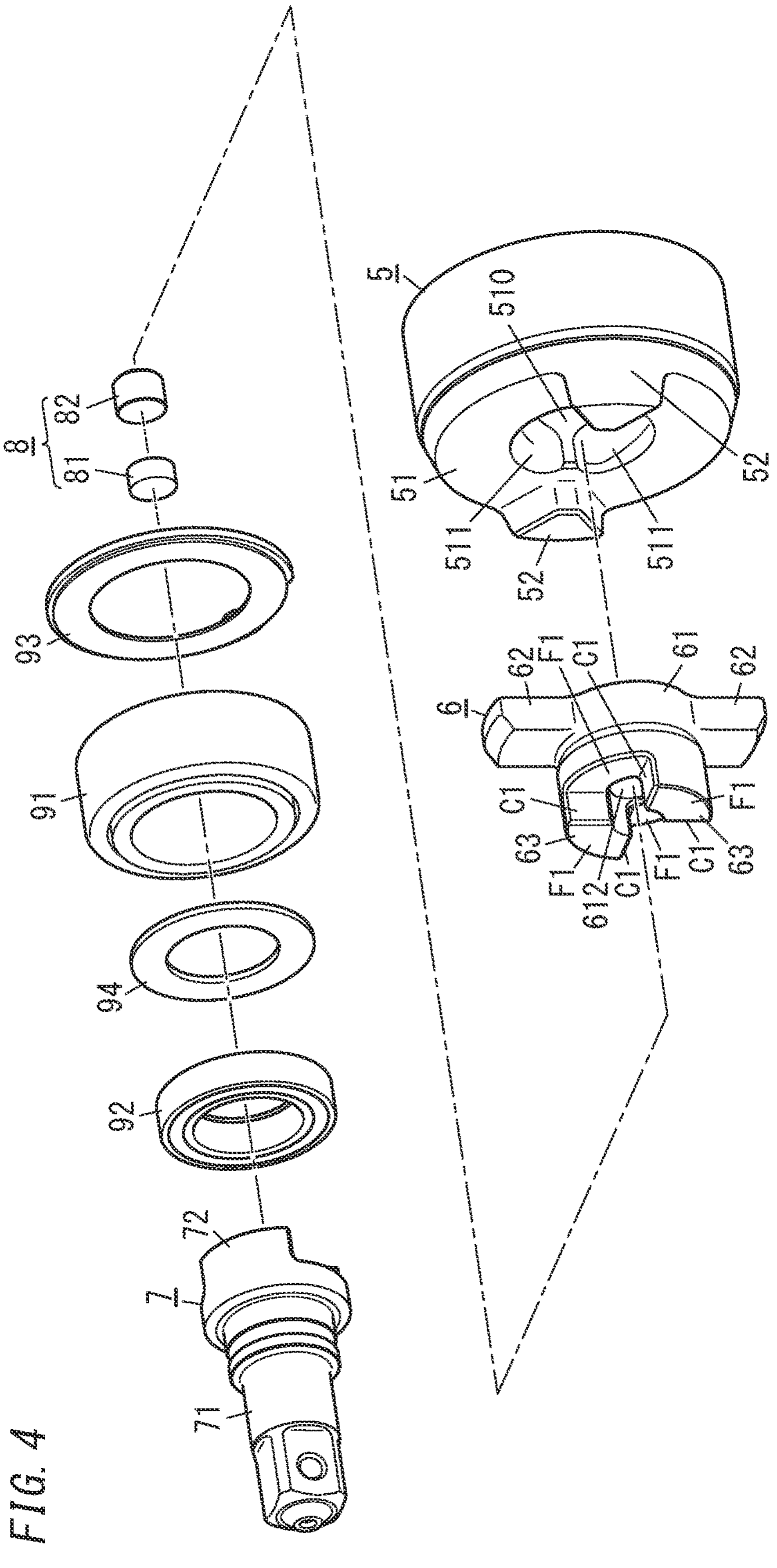
FIG. 4 is an exploded perspective view of the main part of the impact rotary tool as viewed from in front of the impact rotary tool.
Figure 5:
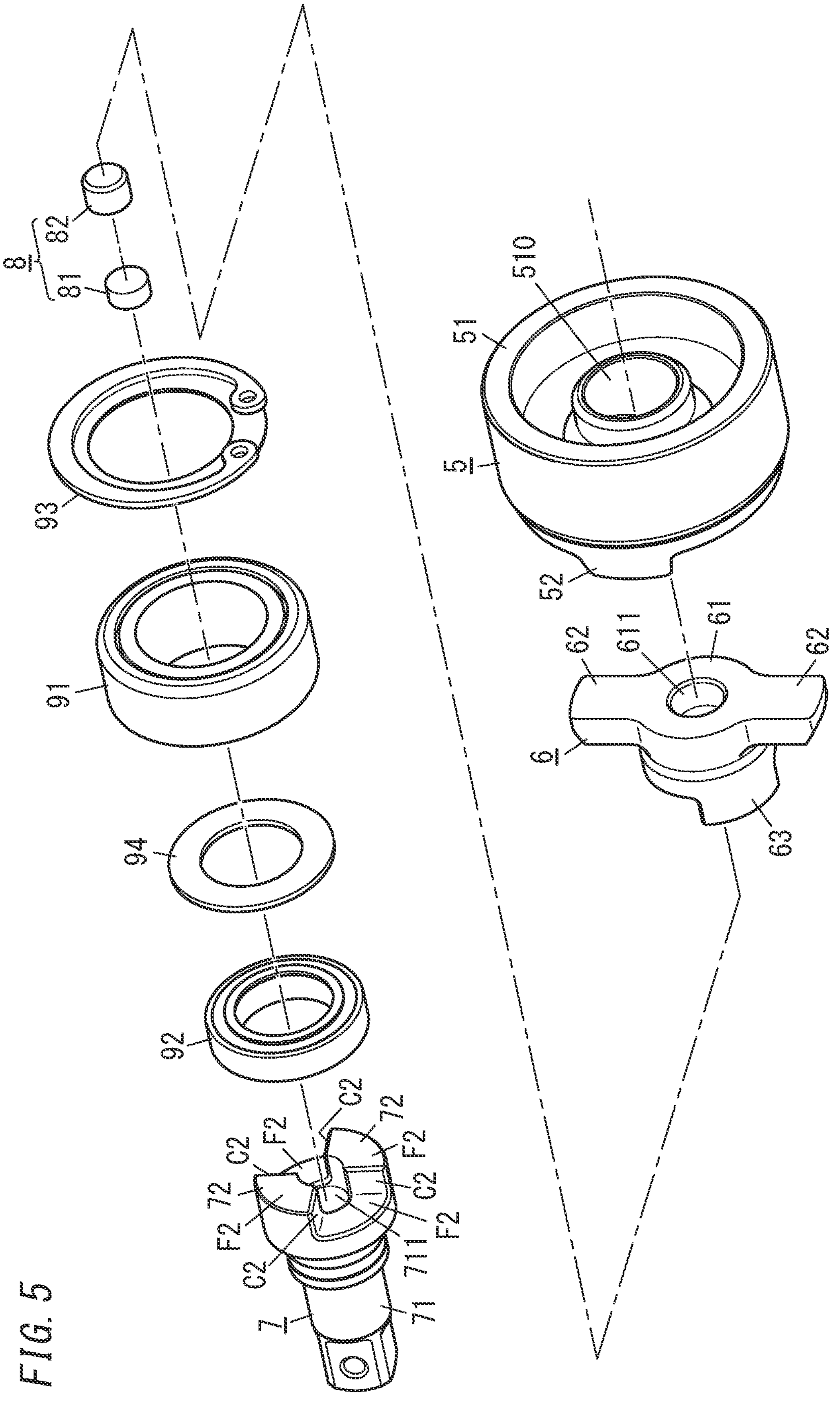
FIG. 5 is an exploded perspective view of the main part of the impact rotary tool as viewed from behind the impact rotary tool.

As shown in FIGS. 3-5, the hammer 5 includes a hammer body 51 and two hammer claws 52. The hammer body 51 has a circular columnar shape. The two hammer claws 52 protrude forward from the hammer body 51. The hammer body 51 has a through hole 510 to pass the drive shaft 42 therethrough.

The hammer body 51 has two grooves 511 on an inner peripheral surface of the through hole 510. As shown in FIG. 2, the drive shaft 42 has two grooves 421 on an outer peripheral surface thereof. The two grooves 421 are connected to each other. Each of the first spheres 44 is sandwiched between a corresponding one of the grooves 511 and a corresponding one of the grooves 421. The grooves 511, the grooves 421, and the first spheres 44 together form a cam mechanism. While the first spheres 44 are rolling inside the grooves 511, 413, the hammer 5 may move along the axis of the drive shaft 42 (i.e., in the forward/backward directions) with respect to the drive shaft 42 and rotate with respect to the drive shaft 42. As the hammer 5 moves either forward or backward along the axis of the drive shaft 42, the hammer 5 rotates with respect to the drive shaft 42.

The anvil 6 faces the hammer body 51 in the forward/backward direction. As shown in FIGS. 3-5, the anvil 6 includes an anvil body 61, two anvil claws 62, and two first contact portions 63. The anvil body 61 has a circular columnar shape. The two anvil claws 62 protrude from the anvil body 61 along the radius of the anvil body 61. The two first contact portions 63 protrude forward from the anvil body 61. That is to say, the two first contact portions 63 protrude in the thrusting direction from the anvil body 61. The two first contact portions 63 are arranged side by side in the rotational direction of the anvil 6.

The anvil body 61 has, on the rear surface thereof, a first recess 611, into which a tip portion of the drive shaft 42 is inserted. In addition, the anvil body 61 also has, on the front surface thereof, a second recess 612, into which the buffer member 8 is inserted.

As the hammer 5 rotates, the two hammer claws 52 push the two anvil claws 62 in the rotational direction of the hammer 5, thus causing the anvil 6 to rotate.

Figure 7:
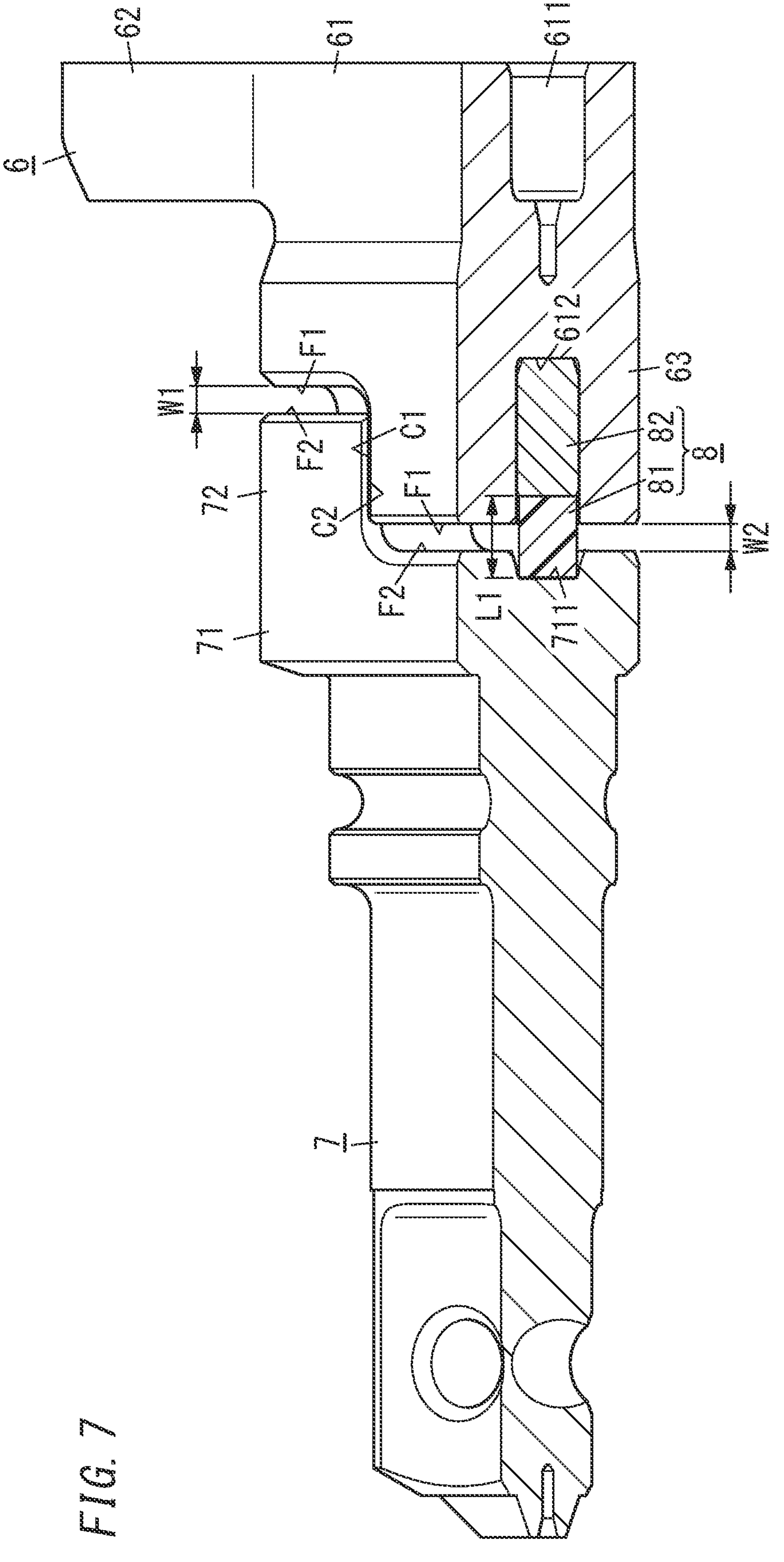
FIG. 7 is a partially cutaway perspective view of the anvil and output shaft of the impact rotary tool.

As shown in FIGS. 4 and 7, the anvil 6 has first contact surfaces C1 and a first facing region F1.

The first contact surfaces C1 are surfaces to contact with second contact surfaces C2 of the output shaft 7 (to be described later). The first contact surfaces C1 face and contact with the second contact surfaces C2 in the rotational direction of the anvil 6. The first contact surfaces C1 are respective surfaces of the two first contact portions 63 and are aligned with the forward/backward direction.

The first facing region F1 is a region to face a second facing region F2 of the output shaft 7 (to be described later). Part of the first facing region F1 is the rest of the front surface of the anvil body 61 other than the parts provided with the two first contact portions 63. Another part of the first facing region F1 is the respective front surfaces of the two first contact portions 63.

The output shaft 7 includes an output shaft body 71 and two second contact portions 72. The output shaft body 71 has a circular columnar shape. The output shaft body 71 is passed through the through hole 2110 (refer to FIG. 1) of the housing 2. The frontend portion of the output shaft body 71 is exposed outside of the housing 2. The output shaft body 71 has, on a rear surface thereof, a recess 711, into which the buffer member 8 is inserted. The two second contact portions 72 protrude backward from the output shaft body 71. That is to say, the two second contact portions 72 protrude in the thrusting direction from the output shaft body 71. The two second contact portions 72 are arranged side by side in the rotational direction of the output shaft 7.

As shown in FIGS. 5 and 7, the output shaft 7 has second contact surfaces C2 and a second facing region F2.

The second contact surfaces C2 are surfaces to contact with the first contact surfaces C1 of the anvil 6. The second contact surfaces C2 face and contact with the first contact surfaces C1 in the rotational direction of the anvil 6. The output shaft 7 rotates upon receiving the rotational force of the anvil 6 on the second contact surfaces C2. The second contact surfaces C2 are respective surfaces of the two second contact portions 72 and are aligned with the forward/backward direction.

The second facing region F2 is a region that faces the first facing region F1 of the anvil 6. Part of the second facing region F2 is the rest of the rear surface of the output shaft body 71 other than the parts provided with the two second contact portions 72. Another part of the second facing region F2 is the respective rear surfaces of the two second contact portions 72.

As can be seen, the output shaft 7 includes the output shaft body 71 and the two second contact portions 72. The two second contact portions 72 protrude in the thrusting direction from the output shaft body 71. The two second contact portions 72 contact with the two first contact portions 63. The two second contact portions 72 receive, from the two first contact portions 63, the force that causes the output shaft 7 to rotate.

The output shaft 7 holds a tip tool thereon. More specifically, the tip tool is attachable to, and removable from, the output shaft 7. In this embodiment, the tip tool is coupled via a chuck to the output shaft 7. The output shaft 7 rotates along with the chuck and the tip tool on receiving torque from the motor 3.

As the anvil 6 rotates, the two first contact portions 63 of the anvil 6 push the two second contact portions 72 of the output shaft 7 in the rotational direction of the anvil 6, thus causing the output shaft 7 to rotate. The output shaft 7 rotates at the same number of revolutions as the anvil 6.

Figure 6:
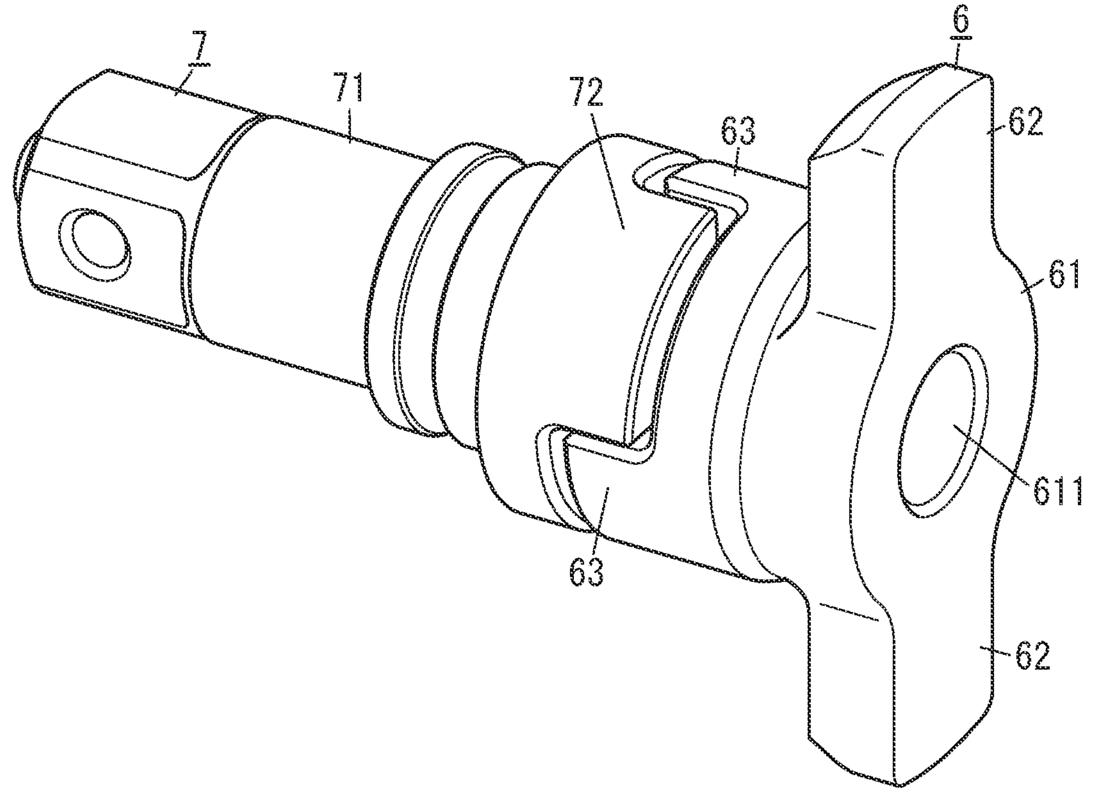
FIG. 6 is a perspective view of the anvil and output shaft of the impact rotary tool.

The rotational direction of the anvil 6 agrees with the rotational direction of the hammer 5. As shown in FIG. 6, the anvil 6 and the output shaft 7 are configured to allow the uneven portions formed by the two first contact portions 63 to engage with the uneven portions formed by the two second contact portions 72.

The chuck and the tip tool are not counted among the constituent elements of the impact rotary tool 1. However, this is only an example and should not be construed as limiting. Alternatively, the impact rotary tool 1 may include at least one of the chuck or the tip tool. Optionally, the tip tool may be coupled directly to the output shaft 7 not via any chuck.

The tip tool may be, for example, a screwdriver bit. The tip tool is fitted into a fastening member as a work target (such as a bolt or a screw). The work of tightening or loosening the screw may be performed by turning the tip tool that is fitted into the screw.

While the impact rotary tool 1 is performing no impact operation, the hammer 5 and the anvil 6 rotate at the same number of revolutions with the two hammer claws 52 and the two anvil claws 62 kept in contact with each other in the rotational direction of the hammer 5. Thus, at this time, the drive shaft 42, the hammer 5, the anvil 6, and the output shaft 7 rotate at the same number of revolutions.

When a torque condition on the magnitude of the torque applied to the output shaft 7 (hereinafter referred to as "load torque") is satisfied, the impact rotary tool 1 starts performing an impact operation. The impact operation is an operation of applying impacting force from the hammer 5 to the anvil 6. In this embodiment, the torque condition is a condition that the load torque become equal to or greater than a predetermined value. That is to say, as the load torque increases, the proportion of a force component having a direction that causes the hammer 5 to retreat increases with respect to the force generated between the hammer 5 and the anvil 6. When the load torque increases to the predetermined value or more, the hammer 5 retreats while compressing the return spring 43. In addition, as the hammer 5 retreats, the hammer 5 rotates while the two hammer claws 52 of the hammer 5 are going over the two anvil claws 62 of the anvil 6. Thereafter, the hammer 5 advances upon receiving recovery force from the return spring 43. Then, when the drive shaft 42 goes approximately half around, the two hammer claws 52 of the hammer 5 collide against the side surfaces 620 of the two anvil claws 62 of the anvil 6 (refer to FIG. 3). In this impact rotary tool 1, every time the drive shaft 42 goes approximately half around, the two hammer claws 52 of the hammer 5 collide against the two anvil claws 62 of the anvil 6. That is to say, every time the drive shaft 42 goes approximately half around, the hammer 5 applies impacting force to the anvil 6.

As can be seen, in this impact rotary tool 1, collisions between the hammer 5 and the anvil 6 occur repeatedly. The torque caused by these collisions allows the screw to be fastened more tightly than in a situation where no collisions occur between the hammer 5 and the anvil 6.

(6) Buffer Member

As shown in FIGS. 4 and 7, the buffer member 8 includes the elastic member 81 and the adjusting member 82. The elastic member 81 and the adjusting member 82 may each have a circular columnar shape, for example.

The elastic member 81 may be made of an elastic material such as rubber. The elastic member 81 is elastically deformed in the thrusting direction (forward/backward direction).

The adjusting member 82 may be made of, for example, a metallic material. The adjusting member 82 is provided separately from the anvil 6 and the output shaft 7.

The elastic modulus of the adjusting member 82 in the thrusting direction is greater than the elastic modulus of the elastic member 81 in the thrusting direction. The elastic member 81 and the adjusting member 82 are arranged side by side in the thrusting direction.

The buffer member 8 is interposed between the anvil 6 and the output shaft 7. More specifically, the adjusting member 82 is inserted into the second recess 612 of the anvil 6 and the elastic member 81 is inserted into the recess 711 of the output shaft 7. The elastic member 81 is interposed between the adjusting member 82 and the output shaft 7. The adjusting member 82 is interposed between the elastic member 81 and the anvil 6.

The buffer member 8 is interposed between the anvil 6 and the output shaft 7, thus regulating the gap distance between the anvil 6 and the output shaft 7. That is to say, the buffer member 8 is interposed between the anvil 6 and the output shaft 7, and therefore, the gap distance between the anvil 6 and the output shaft 7 is determined by the length of the buffer member 8 as measured in the thrusting direction.

The buffer member 8 is disposed on the center axis of the output shaft 7. This increases the chances of the stress applied to the anvil 6 and the output shaft 7 being distributed isotropically around the center axis of the output shaft 7. That is to say, this enables reducing the concentration of stress at a particular point of the anvil 6 and the output shaft 7.

Figure 8:
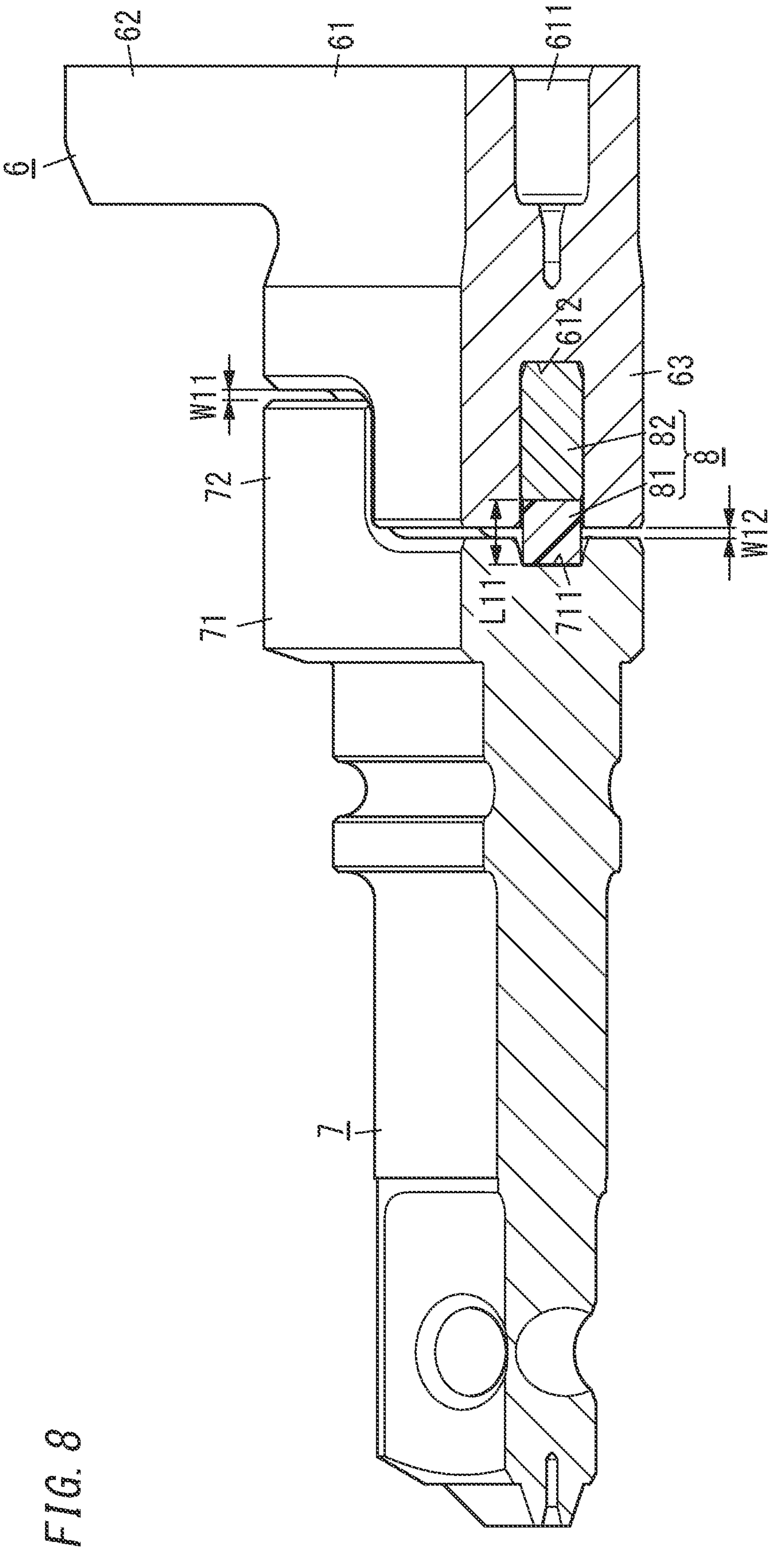
FIG. 8 is a partially cutaway perspective view of the anvil and output shaft of the impact rotary tool.

The force applied from the hammer 5 to the anvil 6 may include a forward component. Thus, the force applied from the hammer 5 to the anvil 6 may cause the anvil 6 to advance toward the output shaft 7 while compressing the elastic member 81. FIG. 7 illustrates the relative positions of the anvil 6 and the output shaft 7 in a state where no forward force is applied from the hammer 5 to the anvil 6. FIG. 8 illustrates the relative positions of the anvil 6 and the output shaft 7 in a state where forward force is applied from the hammer 5 to the anvil 6. As the anvil 6 advances, the length L1 of the elastic member 81 as measured in the forward/backward direction decreases to a shorter length L11. In addition, as the anvil 6 advances, the gap widths W1, W2 between the first facing region F1 and the second facing region F2 decrease to gap widths W11, W12, respectively. The gap widths W1, W11 are the respective widths of the gaps between the anvil body 61 and the two second contact portions 72. The gap widths W2, W12 are the respective widths of the gaps between the output shaft body 71 and the two first contact portions 63.

(7) First Bearing and Second Bearing

As shown in FIG. 2, the first bearing 91 is held by the housing 2. More specifically, the first bearing 91 is held by the first housing portion 211. The first bearing 91 is in contact with the two first contact portions 63 and the two second contact portions 72, thus supporting the anvil 6 and the output shaft 7 rotatably.

The first bearing 91 may be a needle bearing, for example. Using a needle bearing as the first bearing 91 may reduce the chances of the vibration of the anvil 6 and the output shaft 7 in the thrusting direction being transmitted directly to the first bearing 91. This may reduce the chances of the load in the thrusting direction being concentrated toward around respective contact portions between the first bearing 91 and the anvil 6 and between the first bearing 91 and the output shaft 7, thus increasing the durability of the anvil 6 and the output shaft 7.

The first bearing 91 has a ringlike shape in appearance (refer to FIG. 4). The first bearing 91 surrounds the two first contact portions 63 of the anvil 6 and the two second contact portions 72 of the output shaft 7. More specifically, the first bearing 91 surrounds the two first contact portions 63 from their front end through their rear end. In addition, the first bearing 91 also surrounds the two second contact portions 72 from their front end through their rear end.

The first bearing 91 is in contact with the two first contact portions 63 and anvil body 61 of the anvil 6 to support the anvil 6 rotatably.

The first bearing 91 is in contact with the two second contact portions 72 and output shaft body 71 of the output shaft 7 to support the output shaft 7 rotatably.

The second bearing 92 is disposed forward of the first bearing 91. The second bearing 92 is held by the housing 2. More specifically, the second bearing 92 is held by the first housing portion 211. The second bearing 92 supports the output shaft 7 rotatably.

The second bearing 92 may be a ball bearing, for example. The second bearing 92 has a ringlike shape in appearance (refer to FIG. 4).

The second bearing 92 is in contact with the output shaft body 71 to support the output shaft 7 rotatably. Providing the second bearing 92 may reduce the chances of the output shaft 7 causing axial runout.

In addition, a first stopper 93 and a second stopper 94 are provided to reduce the backlash of the first bearing 91 and the second bearing 92 in the forward/backward directions (refer to FIGS. 2 and 4).

The first stopper 93 has a ringlike shape. The first stopper 93 is disposed backward of the first bearing 91. The first stopper 93 faces the first bearing 91.

The second stopper 94 has a ringlike shape. The second stopper 94 is disposed forward of the first bearing 91. More specifically, the second stopper 94 is disposed between the first bearing 91 and the second bearing 92. The second stopper 94 faces the first bearing 91 and the second bearing 92.

As the first bearing 91 is going to move in the forward/backward direction, the first bearing 91 comes into contact either the first stopper 93 or the second stopper 94. This regulates the movement of the first bearing 91. Also, as the second bearing 92 is going to move in the backward direction, the second bearing 92 comes into contact with the second stopper 94. This regulates the movement of the second bearing 92.

(8) Degree of Compression of Elastic Member

As described above, as forward force is applied from the hammer 5 to the anvil 6, the anvil 6 may advance toward the output shaft 7 while compressing the elastic member 81 as shown in FIG. 8. In this case, if the anvil 6 collides against the output shaft 7 to produce vibrations, then a collision noise is generated by the anvil 6 and the output shaft 7 or the vibrations are transmitted to the housing 2 to generate a noise from the entire housing 2, which is an unfavorable situation. In addition, when the housing 2 vibrates, the vibrations are also transmitted to the worker who is gripping the housing 2, thus possibly making the worker feel uncomfortable at work. Thus, the impact rotary tool 1 according to this embodiment sets the parameters of the buffer member 8 to reduce the chances of the anvil 6 colliding against the output shaft 7. Examples of the parameters of the buffer member 8 include the respective lengths of the elastic member 81 and the adjusting member 82 as measured in the thrusting direction and the elastic modulus of the elastic member 81 as measured in the thrusting direction.

Specifically, the parameters of the buffer member 8 are set such that when a maximum load is transmitted from the hammer 5 to the elastic member 81, the second facing region F2 faces the first facing region F1 with a gap left between the second facing region F2 and the first facing region F1 in the thrusting direction. The magnitude of the maximum load transmitted from the hammer 5 to the elastic member 81 is determined by, for example, the shape and elastic modulus of the return spring 43 and the rotational velocity of the motor 3.

The degree of compression P to be defined below needs to be less than the gap distances (i.e., gap widths (W1, W2)) in the thrusting direction between the first facing region F1 and the second facing region F2 when load of predetermined magnitude, which is smaller than the maximum load described above, is applied to the elastic member 81. The degree of compression P is a quantity calculated by subtracting the length L11 (refer to FIG. 8) of the elastic member 81 as measured in the thrusting direction when the maximum load is applied to the elastic member 81 from the length L1 (refer to FIG. 7) of the elastic member 81 as measured in the thrusting direction when load of the predetermined magnitude is applied to the elastic member 81. This may reduce the chances of the anvil 6 and the output shaft 7 colliding against each other when the maximum load is applied to the elastic member 81.

The predetermined magnitude may be equal to zero. That is to say, the expression “load of predetermined magnitude is applied to the elastic member 81” may herein refer to no-load condition of the elastic member 81.

Furthermore, load may be applied to the elastic member 81 from not only the hammer 5 but also the output shaft 7 as well. Thus, chances are that load, which is even greater than the maximum load transmitted from the hammer 5 to the elastic member 81, may be applied to the elastic member 81. Even in such a situation, the first facing region F1 and the second facing region F2 preferably face each other with a gap left between themselves in the thrusting direction.

Thus, the parameters of the buffer member 8 may be designed such that when load, of which the magnitude is equal to or less than the upper limit in the elastic range of the elastic member 81, is applied to the elastic member 81, the second facing region F2 faces the first facing region F1 with a gap left between themselves in the thrusting direction. Also, the parameters of the buffer member 8 may be designed such that when load, of which the magnitude is at most a predetermined number of times (which is less than one and may be 0.9, for example) as large as the upper limit in the elastic range of the elastic member 81, is applied to the elastic member 81, the second facing region F2 faces the first facing region F1 with a gap left between themselves in the thrusting direction.

Also, the buffer member 8 according to this embodiment includes not only the elastic member 81 but also the adjusting member 82 as well. The adjusting member 82 has a larger elastic modulus than the elastic member 81. More specifically, the adjusting member 82 is hardly compression deformed.

The elastic member 81 and the adjusting member 82 are arranged side by side in the thrusting direction. Thus, the length of the elastic member 81 in the thrusting direction may be shortened by the length of the adjusting member 82 compared to a situation where the buffer member 8 consists of the elastic member 81 alone.

The shorter the length of the elastic member 81 in the thrusting direction is, the less likely the elastic member 81 is deformed. In other words, the shorter the length of the elastic member 81 in the thrusting direction is, the smaller the degree of compression of the elastic member 81 is when force of predetermined magnitude is applied in the thrusting direction to the elastic member 81. Thus, the shorter the length of the elastic member 81 in the thrusting direction is, the less significantly the gap distances (i.e., gap widths (W1, W2)) between the first facing region F1 and the second facing region F2 vary upon the application of force in the thrusting direction to the elastic member 81. This enables further shortening the gap distances between the first facing region F1 and the second facing region F2 when the force of predetermined magnitude is not applied in the thrusting direction to the elastic member 81, thereby shortening the length from the rear end of the anvil 6 through the front end of the output shaft 7. This contributes to downsizing the impact rotary tool 1.

(9) Reinforcement by First Bearing

The first bearing 91 according to this embodiment is in contact with the first contact portions 63 of the anvil 6 and the second contact portions 72 of the output shaft 7 and supports the anvil 6 and the output shaft 7 rotatably. The first contact portions 63 and the second contact portions 72 have their mechanical strength enhanced by contacting with the first bearing 91. In particular, the first contact portions 63 and the second contact portions 72 have their mechanical strength enhanced significantly against vibrations along the radius of the output shaft 7. This increases the durability of the anvil 6 and the output shaft 7.

Among the constituent elements of the anvil 6, the first contact portions 63 are less rigid than the anvil body 61. Among the constituent elements of the output shaft 7, the second contact portions 72 are less rigid than the output shaft body 71. Reinforcing such first contact portions 63 and second contact portions 72 contributes to extending the life of the anvil 6 and the output shaft 7.

(First Variation)

Figure 9:
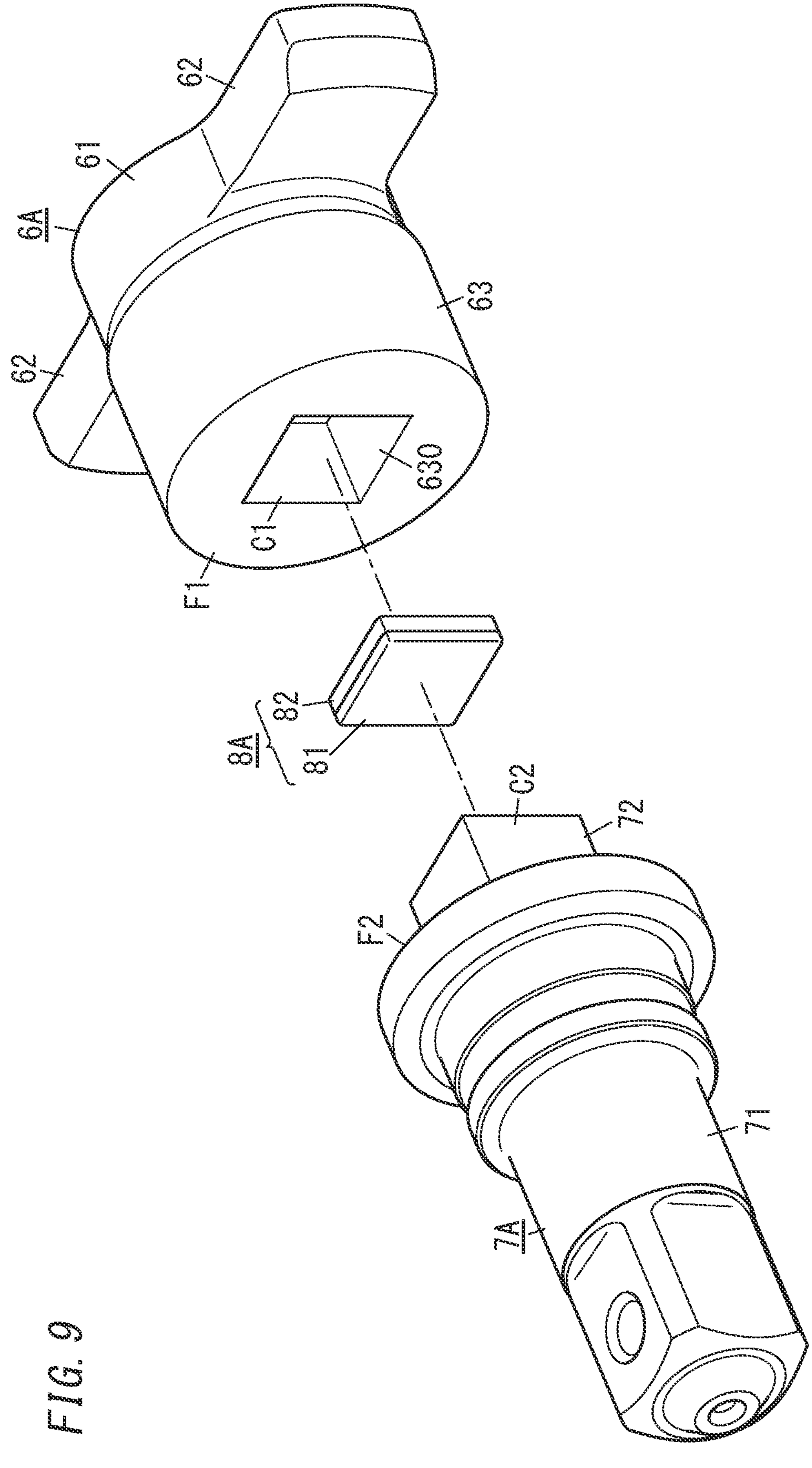
FIG. 9 is an exploded perspective view of a main part of an impact rotary tool according to a first variation.

Next, an impact rotary tool 1 according to a first variation will be described with reference to FIG. 9. In the following description, any constituent element of this first variation, having the same function as a counterpart of the embodiment described above, will be designated by the same reference numeral as that counterpart's, and description thereof will be omitted herein.

The impact rotary tool 1 according to the first variation includes an anvil 6A, an output shaft 7A, and a buffer member 8 A instead of the anvil 6, the output shaft 7, and the buffer member 8, respectively.

The anvil 6A includes an anvil body 61, two anvil claws 62, and a first contact portion 63. The anvil body 61 has a circular columnar shape. The two anvil claws 62 protrude from the anvil body 61 along the radius of the anvil body 61. The first contact portion 63 has a circular columnar shape. The first contact portion 63 protrudes forward from the anvil body 61.

The first contact portion 63 has, on a front surface thereof, a recess 630, into which a second contact portion 72 of the output shaft 7A and the buffer member 8A are inserted. Also, the rest of the front surface of the first contact portion 63 other than the part provided with the recess 630 is the first facing region F1 facing the output shaft 7A.

The output shaft 7A includes an output shaft body 71 and a second contact portion 72. The output shaft body 71 has a circular columnar shape. The second contact portion 72 has a columnar shape. The second contact portion 72 protrudes backward from the output shaft body 71. The rest of the rear surface of the output shaft body 71 other than the part provided with the second contact portion 72 is the second facing region F2 facing the first facing region F1. In the forward/backward direction, a gap is left between the first facing region F1 and the second facing region F2.

The second contact portion 72 has a shape that matches the shape of the recess 630 of the first contact portion 63. More specifically, in rear view, the second contact portion 72 has a square shape. In front view, the recess 630 has a square shape. The outer side surfaces (the second contact surfaces C2), aligned with the forward/backward direction, of the second contact portion 72 are in contact with the inner side surfaces (first contact surfaces C1), aligned with the forward/backward direction, of the recess 630. This allows the rotation of the anvil 6A to be transmitted to the output shaft 7A.

The buffer member 8A includes an elastic member 81 and an adjusting member 82, which are arranged side by side in the forward/backward direction. The buffer member 8A is interposed between the second contact portion 72 and the bottom surface of the recess 630.

Meanwhile, the first bearing 91 (refer to FIG. 2) is in contact with the first contact portion 63 and supports the anvil 6A rotatably. The output shaft 7A is supported by the first bearing 91 via the anvil 6A.

According to this first variation, the buffer member 8A may also regulate the gap distance between the first facing region F1 of the anvil 6A and the second facing region F2 of the output shaft 7A. In addition, according to this first variation, the anvil 6A and the output shaft 7A may be reinforced by the first bearing 91.

According to this first variation, the second contact portion 72 is inserted into the recess 630 of the first contact portion 63. Alternatively, the first contact portion 63 may be inserted into a recess provided for the second contact portion 72.

Figure 10:
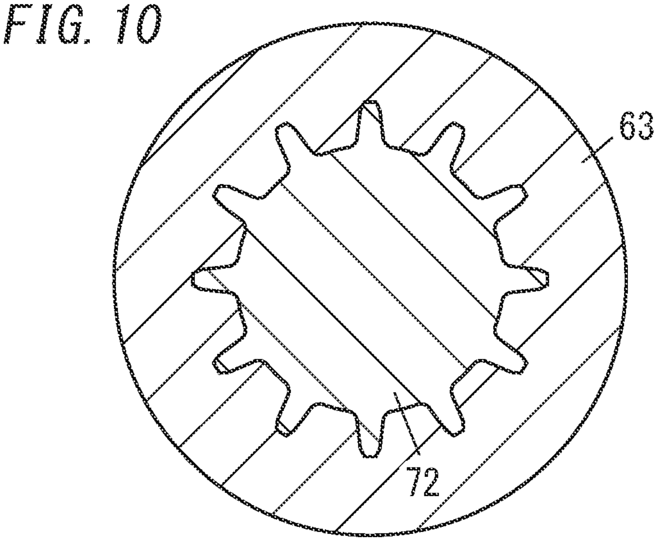
FIG. 10 is a cross-sectional view of a main part of an impact rotary tool according to a second variation.

This first variation may also be further modified into a second variation, in which the second contact portion 72 is formed in the shape of splines as shown in FIG. 10. That is to say, the outer peripheral surface of the second contact portion 72 may be provided with a plurality of teeth. In that case, the inner surface of the first contact portion 63 may be provided with a plurality of teeth that mesh with the plurality of teeth of the second contact portion 72.

The shapes of the anvil 6A and the output shaft 7A according to the first and second variations are different from the shapes of the anvil 6 and the output shaft 7 according to the exemplary embodiment. Thus, to apply torque, of which the magnitude is as large as that of the torque transmitted from the anvil 6 to the output shaft 7 in the exemplary embodiment described above, from the anvil 6A to the output shaft 7A according to this first variation, the anvil 6A and the output shaft 7A need to have larger diameters than their counterparts of the exemplary embodiment. Stated otherwise, the configuration in which the plurality of first contact portions 63 are arranged side by side in the rotational direction of the anvil 6 and the plurality of second contact portions 72 are arranged side by side in the rotational direction of the output shaft 7 as in the exemplary embodiment described above may contribute to downsizing the anvil 6 and the output shaft 7.

Other Variations of Exemplary Embodiment

Next, other variations of the exemplary embodiment will be enumerated one after another. Note that the variations to be described below may be adopted in combination as appropriate. Alternatively, the variations to be described below may also be combined, as appropriate, with any of the variations described above.

The number of the hammer claws 52 and the number of the anvil claws 62 do not have to be two but may also be one or three or more.

The number of the first contact portions 63 of the anvil 6 and the number of the second contact portions 72 of the output shaft 7 do not have to be two but may also be one or three or more.

Each of the first facing region F1 and the second facing region F2 does not have to be a planar surface but may also be a curved surface.

In the exemplary embodiment described above, the elastic member 81 is located forward of the adjusting member 82. Alternatively, the adjusting member 82 may also be located forward of the elastic member 81.

The buffer member 8 may include a plurality of elastic members 81.

The buffer member 8 may include a plurality of adjusting members 82.

In the exemplary embodiment described above, the first bearing 91 surrounds the first contact portions 63 of the anvil 6 entirely. Alternatively, the first bearing 91 may surround the first contact portions 63 only partially.

In the exemplary embodiment described above, the first bearing 91 surrounds the second contact portions 72 of the output shaft 7 entirely. Alternatively, the first bearing 91 may surround the second contact portions 72 only partially.

The first bearing 91 does not have to be in contact with the anvil body 61.

The first bearing 91 does not have to be in contact with the output shaft body 71.

The first bearing 91 does not have to be in contact with both the first contact portions 63 and the second contact portions 72 but may be in contact with at least one of the first contact portions 63 or the second contact portions 72. Also, if the impact rotary tool 1 includes both the first bearing 91 and the second bearing 92, the first bearing 91 may be in contact with the first contact portions 63 and the second bearing 92 may be in contact with the second contact portions 72, for example. Alternatively, the first bearing 91 may be in contact with the second contact portions 72 and the second bearing 92 may be in contact with the first contact portions 63. Furthermore, if the first bearing 91 is in contact with both the first contact portions 63 and the second contact portions 72, the second bearing 92 may be in contact with the output shaft 7 as in the exemplary embodiment described above or may be in contact with the anvil 6.

The first bearing 91 does not have to be a needle bearing. Alternatively, the first bearing 91 may also be, for example, a bush, a ball bearing, or a double row angular contact ball bearing.

The second bearing 92 does not have to be a ball bearing. Alternatively, the second bearing 92 may also be, for example, a bush, a needle bearing, or a double row angular contact ball bearing.

The adjusting member 82 may be formed integrally with either the anvil 6 or the output shaft 7. Nevertheless, it is preferable that the adjusting member 82 be separate from the anvil 6 because such a configuration would reduce the concentration of stress at a particular point of the anvil 6. In addition, it is preferable that the adjusting member 82 be separate from the output shaft 7 because such a configuration would reduce the concentration of stress at a particular point of the output shaft 7.

The elastic member 81 and the adjusting member 82 may be bonded together with an adhesive, for example.

The magnitude of the maximum load transmitted from the hammer 5 to the elastic member 81 may be defined to be equal to the maximum spring force applied from the return spring 43 to the hammer 5.

(Recapitulation)

The exemplary embodiment and its variations described above are specific implementations of the following aspects of the present disclosure.

An impact rotary tool (1) according to a first aspect includes a hammer (5), an anvil (6, 6A), an output shaft (7, 7A), a housing (2), a bearing (first bearing 91), and a buffer member (8, 8A). The hammer (5) rotates upon receiving motive power from a motor (3). The anvil (6, 6A) rotates upon receiving, from the hammer (5), impacting force in a rotational direction of the hammer (5). The output shaft (7, 7A) is configured to hold a tip tool thereon and rotates along with the anvil (6, 6A) upon receiving, from the anvil (6, 6A), force in a rotational direction of the anvil (6, 6A). The housing (2) houses the hammer (5) and the anvil (6, 6A). The bearing (first bearing 91) is held by the housing (2) and supports the output shaft (7, 7A) rotatably. The buffer member (8, 8A) includes an elastic member (81) to be elastically deformed in a thrusting direction aligned with a rotational axis of the output shaft (7, 7A). The anvil (6, 6A) has a first facing region (F1) facing the output shaft (7, 7A) in the thrusting direction. The output shaft (7, 7A) has a second facing region (F2) facing the first facing region (F1) in the thrusting direction. The buffer member (8, 8A) is interposed between the anvil (6, 6A) and the output shaft (7, 7A). The elastic member (81) is compressed in the thrusting direction under a load transmitted in the thrusting direction from the hammer (5). The buffer member (8, 8A) regulates a gap distance between the second facing region (F2) and the first facing region (F1) such that when a maximum load is transmitted from the hammer (5) to the elastic member (81), the second facing region (F2) faces the first facing region (F1) with a gap left between the second facing region (F2) and the first facing region (F1) in the thrusting direction.

This configuration may reduce the chances of the anvil (6, 6A) colliding against the output shaft (7, 7A), thus reducing not only the chances of generating a collision noise but also the chances of vibrations caused by the collision being transmitted to the housing (2).

In an impact rotary tool (1) according to a second aspect, which may be implemented in conjunction with the first aspect, the anvil (6, 6A) includes: an anvil body (61); and a first contact portion (63) protruding from the anvil body (61) in the thrusting direction. The output shaft (7, 7A) includes: an output shaft body (71); and a second contact portion (72) protruding from the output shaft body (71) in the thrusting direction. The second contact portion (72) contacts with the first contact portion (63) to receive, from the first contact portion (63), force that causes the output shaft (7, 7A) to rotate.

This configuration contributes to improving the transmission efficiency of torque from the anvil (6, 6A) to the output shaft (7, 7A) by bringing the anvil (6, 6A) and the output shaft (7, 7A) into contact with each other at the first contact portion (63) protruding from the anvil body (61) and the second contact portion (72) protruding from the output shaft body (71).

In an impact rotary tool (1) according to a third aspect, which may be implemented in conjunction with the second aspect, the anvil (6) includes a plurality of the first contact portions (63). The plurality of the first contact portions (63) are arranged side by side in the rotational direction of the anvil (6). The output shaft (7) includes a plurality of the second contact portions (72). The plurality of the second contact portions (72) are arranged side by side in a rotational direction of the output shaft (7).

This configuration contributes to further improving the transmission efficiency of torque from the anvil (6) to the output shaft (7).

In an impact rotary tool (1) according to a fourth aspect, which may be implemented in conjunction with any one of the first to third aspects, the buffer member (8, 8A) is disposed on a center axis of the output shaft (7, 7A).

This configuration increases the chances of the stress applied to the anvil (6, 6A) and the output shaft (7, 7A) being distributed isotropically around the center axis of the output shaft (7, 7A). That is to say, this configuration may reduce the concentration of the stress at a particular point of the anvil (6, 6A) and the output shaft (7, 7A).

In an impact rotary tool (1) according to a fifth aspect, which may be implemented in conjunction with any one of the first to fourth aspects, the buffer member (8, 8A) further includes an adjusting member (82) having a larger elastic modulus in the thrusting direction than the elastic member (81). The elastic member (81) and the adjusting member (82) are arranged side by side in the thrusting direction.

This configuration enables shortening the length of the elastic member (81) in the thrusting direction by the length of the adjusting member (82).

In an impact rotary tool (1) according to a sixth aspect, which may be implemented in conjunction with the fifth aspect, the adjusting member (82) is separate from the anvil (6, 6A) and the output shaft (7, 7A).

This configuration reduces, compared to a situation where the adjusting member (82) forms an integral part of the anvil (6, 6A), the concentration of stress at a particular point of the anvil (6, 6A). In addition, this configuration also reduces, compared to a situation where the adjusting member (82) forms an integral part of the output shaft (7, 7A), the concentration of stress at a particular point of the output shaft (7, 7A).

Note that the constituent elements according to the second to sixth aspects are not essential constituent elements for the impact rotary tool (1) but may be omitted as appropriate.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. An impact rotary tool comprising:

a hammer configured to rotate upon receiving motive power from a motor;

an anvil configured to rotate upon receiving, from the hammer, impacting force in a rotational direction of the hammer;

an output shaft configured to hold a tip tool thereon and rotate along with the anvil upon receiving, from the anvil, force in a rotational direction of the anvil;

a housing that houses the hammer and the anvil;

a bearing held by the housing and supporting the output shaft rotatably; and a buffer member including an elastic member configured to be elastically deformed in a thrusting direction aligned with a rotational axis of the output shaft, the anvil having a first facing region facing the output shaft in the thrusting direction, the output shaft having a second facing region facing the first facing region in the thrusting direction, the buffer member being interposed between the anvil and the output shaft, the elastic member being compressed in the thrusting direction under a load transmitted in the thrusting direction from the hammer, the buffer member being configured to regulate a gap distance between the second facing region and the first facing region such that when a maximum load is transmitted from the hammer to the elastic member, the second facing region faces the first facing region with a gap left between the second facing region and the first facing region in the thrusting direction, and the bearing being a member having a ringlike shape and an inner surface of the bearing being in contact with the anvil and the output shaft.

2. The impact rotary tool of claim 1, wherein the anvil includes: an anvil body; and a first contact portion protruding from the anvil body in the thrusting direction, and the output shaft includes: an output shaft body; and a second contact portion protruding from the output shaft body in the thrusting direction and configured to contact with the first contact portion to receive, from the first contact portion, force that causes the output shaft to rotate.

3. The impact rotary tool of claim 2, wherein the anvil includes a plurality of the first contact portions, the plurality of the first contact portions being arranged side by side in the rotational direction of the anvil, and the output shaft includes a plurality of the second contact portions, the plurality of the second contact portions being arranged side by side in a rotational direction of the output shaft.

4. The impact rotary tool of claim 1, wherein the buffer member is disposed on a center axis of the output shaft.

5. The impact rotary tool of claim 1, wherein the buffer member further includes an adjusting member having a larger elastic modulus in the thrusting direction than the elastic member, and the elastic member and the adjusting member are arranged side by side in the thrusting direction.

6. The impact rotary tool of claim 5, wherein the adjusting member is separate from the anvil and the output shaft.

* * * * *